United States Patent [19]
Smith

[11] Patent Number: 5,880,180
[45] Date of Patent: Mar. 9, 1999

[54] ALDIMINE SURFACE QUALITY ENHANCERS

[75] Inventor: Cynthia L. Smith, Marysville, Ohio

[73] Assignee: Ashland Inc., Russell, Ky.

[21] Appl. No.: 938,363

[22] Filed: Sep. 26, 1997

[51] Int. Cl.⁶ .................. C08K 5/29; C08L 67/06
[52] U.S. Cl. .................. 523/508; 523/523; 523/500; 524/257; 524/714
[58] Field of Search .................. 523/508, 523; 524/257, 714

[56] References Cited

U.S. PATENT DOCUMENTS

| | | | |
|---|---|---|---|
| 3,932,357 | 1/1976 | Schmitt et al. | 528/64 |
| 3,997,627 | 12/1976 | Ichimura et al. | 526/320 |
| 4,421,894 | 12/1983 | O'Connor et al. | 525/28 |
| 4,579,890 | 4/1986 | Domeier | 523/512 |
| 4,622,354 | 11/1986 | Iseler et al. | 523/527 |
| 4,673,706 | 6/1987 | Atkins | 523/111 |
| 4,764,537 | 8/1988 | Horn et al. . | |
| 5,504,151 | 4/1996 | Fisher et al. | 525/49 |

FOREIGN PATENT DOCUMENTS

| | | |
|---|---|---|
| HEI 5-59136 | 3/1993 | Japan . |
| WO/91/06604 | 5/1991 | WIPO . |
| WO91/17136 | 11/1991 | WIPO . |

*Primary Examiner*—Tae Yoon
*Attorney, Agent, or Firm*—Mary E. Picken

[57] ABSTRACT

This invention is the addition of an aldimine to enhance the ability of thermoplastic low profile additives to improve the surface quality of cured sheet molding compound vehicle parts.

16 Claims, No Drawings

ALDIMINE SURFACE QUALITY ENHANCERS

This invention relates to surface quality enhancer additives to unsaturated polyester resins for molding into plastic vehicle body parts.

Surface smoothness of low shrinkage polyester molding compositions, such as sheet-molding compound (SMC), can be improved with the addition of an aldimine, the reaction product of an aldehyde and an amine or a polyamine. These aldimines can be incorporated into the SMC formulation at low levels and do not necessitate any other formulation changes. Addition of the surface quality enhancers of this invention does not necessitate any deviation from typical processing methods.

Compression-molded polyester composites are well know to the art and are used in a variety of applications. Low-shrinkage, or low-profile, polyester molding compositions are of particular importance in the transportation industry, because they can be used to produce moldings with smooth, high-gloss surfaces. SMC is a common, cost-effective processing method for polyester composites. These compositions typically include an unsaturated polyester resin, a thermoplastic low-profile additive resin such as a polyurethane, polyvinylacetate, polymethylmethacrylate, polystyrene, or saturated polyester, a cross-linking vinyl monomer, an initiator such as t-butyl perbenzoate, a thickening agent, a mineral filler, and a fiberglass reinforcing material. With the drive towards improved surface quality without increasing levels of expensive thermoplastic low-profile additives, a variety of new materials have been disclosed recently.

Iseler U.S. Pat. No. 4,622,354 adds a phase-stabilizing material, to improve glass read-out and provide for a Class A surface in a polyester molding composition using a dual thickening mechanism. Atkins U.S. Pat. No. 4,673,706 adds vinyl monomers and epoxy compounds to improve cure shrinkage. Ross, et al., in WO 91/17136 and WO 91/06604 describe various compatible ester and polyester compounds which improve surface quality when added to SMC formulations.

Ashland U.S. Pat. No. 5,504,151 describes a surface quality enhancer for thermoplastic low profile additives where the enhancer is a polycapped oligomer adduct of a long chain fatty acid and a polyester polyol.

DETAILED DESCRIPTION OF THE INVENTION

This invention is the use of an aldimine additive to improve the efficiency of low profile additives (LPAs) and improve surface quality of such molding compositions. Examples of such aldimine additives are compounds made from polyamines such as meta-xylylene diamine or trimethylolpropane tris[poly{propylene glycol}, amine terminated] ether, or isophorone diamine, individually reacted with aldehydes such as heptaldehyde or benzaldehyde. These aldimines, when added to polyester thermoset molding compounds, such as SMC, result in moldings with improved surface quality over the control system lacking aldimines.

These aldimines do not act as low-profile additives by themselves, but rather enhance the low-profile effect when combined with known LPAs. Improvements in surface quality, as measured by the LORIA[1] surface analyzer, are quite dramatic, in the range of 10–30 surface quality index units improvement over the control system lacking aldimine. Some low-profile additives, and combinations of low-profile additives and unsaturated polyester resins, appear to be more greatly affected by the addition of the aldimine material. These aldimine additives have been shown to be effective with a variety of low-profile additives, including polyurethane, polyester, polymethyl methacrylate, polyvinylacetate, polystyrene and epoxy-linked LPAs. The aldimine additives have been effective with propylene maleate, orthophthalic, and isophthalic unsaturated polyester resins, all typically used in the industry.

The first ingredient of the polyester resin system in which the aldimine additive of this invention is used is an unsaturated polyester resin. These resins are made by reacting unsaturated acids or anhydrides with polyhydric alcohols, using methods and reactants well known in the art of polyester technology. See, for example, Kirk-Othmer, Encyclopedia of Chemical Technology, Third Edition, Volume 18, pages 575–580 (1982). Typical reactants include maleic acid, fumaric acid, aconitic acid, mesaconic acid, maleic anhydride, itaconic anhydride and citraconic anhydride and the glycols, such as ethylene glycol, diethylene glycol, triethylene glycol, polyethylene glycol, propylene glycol, dipropylene glycol, polypropylene glycol, 1,3-butanediol, 1,4-butanediol, neopentyl glycol, cyclohexanedimethanol, 2,2,4-trimethylpentanediol, ethoxylated and/or propoxylated bisphenol A, trimethylolethane, hydrogenated bisphenol A, trimethylolpropane, dicyclopentadiene glycol and dibromonopentyl glycol. Under some circumstances, the polyester resins may further contain, as co-condensed units, other compounds, such as dibasic aromatic acids and anhydrides and saturated aliphatic dibasic acids, which act as modifiers. Such compounds include phthalic anhydride, isophthalic acid, adipic acid, succinic acid, azelaic acid (nonanedioic), sebacic acid, as well as terephthalic acid, various hydrogenated phthalic anhydride derivatives, trimellitic anhydride, cyclohexane-dicarboxylic acid, the anhydrides of chlorendic, tetrabromophthalic and tetrachlorophthalic acids. Both amorphous and crystalline unsaturated polyester resins and mixtures are used with the aldimine enhancer of this invention.

The second ingredient of the resin composition, in which the aldimine additive of this invention is used, is a thermoplastic additive for improving the surface quality of molded articles, often referred to as low-profile additives (LPAs). One such additive is the URALLOY hybrid polymer low profile additive available from Ashland Chemical Company, Division of Ashland Inc., the polyurethane oligomer reaction product of an isocyanate-terminated prepolymer and a polyester polyol described in U.S. Pat. No. 4,421,894. Other low profile additives, similarly useful with the additive of this invention, include polyvinylacetate polymers and copolymers, polyacrylates, polymethacrylates, and copolymers such as polymethylmethacrylate, polymethylacrylate, polybutylacrylate, and saturated polyesters prepared from dibasic acids or anhydrides such as succinic, adipic, sebacic, phthalic, isophthalic, terephthalic and trimellitic reacted with glycols such as ethylene glycol, diethylene glycol, propylene glycol, dipropylene glycol, neopentyl glycol, glycols of polyethylene oxide glycol, glycols of polypropylene oxide, butanediol and cyclohexane dimethanol. Also included are various styrene polymers and co-polymers such as polystyrene-butadiene.

The third ingredient of the resin composition is the additive of this invention. Aldimine compounds of this invention may have a functionality $\geq 1$ and a molecular weight of 200 to 15,000, preferred are those which have a functionality of 2 to 3 and a molecular weight of 500 to 5300. The polyimines of this invention are the reaction products obtained from the condensation reaction of an amine or polyamine having ≧1 primary amino groups with an organic aldehyde, optionally in the presence of a solvent. Preferred are polyamines having 2 to 3 primary amino groups which are bound to aromatic or preferably aliphatic or cycloaliphatic residues, and having a molecular weight of 31 to 5000, preferably 70 to 5000. Primary amine compounds useful in this invention include those represented by the formula R-$(NH_2)$x where R is a hydrocarbon group, which may also contain oxygen, nitrogen, sulfur or halogen, wherein x is ≧1, preferably 2 to 3. Suitable amines include: propylamine, isopropylamine, butylamine, cyclohexylamine, ethylene diamine, propylene diamine, tetramethylene diamine, pentamethylene diamine, hexamethylene diamine, isophorone diamine, dicyclohexylmethane diamine, cyclohexane diamine, 1,3-cyclohexane bis (methylamine), 2-methylpentamethylene diamine, 1,1 2-dodecane diamine, bis-hexamethylene diamine, dimethylethylene diamine, diethylethylene diamine, dimethyl propylene diamine, diethyl propylene diamine, pentaethylene hexamine, diethylene triamine, xylylene diamine, m-phenylene diamine, p-phenylene diamine, 4,4'-methylene dianiline, 4,4'-diaminodiphenyl sulfone, 2,6-diaminopyridine, 4,4'-methylene bis(3-chloroaniline), 4,4'-methylene bis(3-chloro-2,6-diethylaniline), 4,4'-methylene bis(3-chloro-2,5-diethylaniline), 3,3'-diisopropyl-4,4'-diaminodiphenylmethane, 3,5,3',5'-tetraethyl-4,4'-diaminodiphenylmethane, 1-methyl-3,5-diethyl-2,4-diaminobenzene, 1-methyl-3,5-diethyl-2,6-diaminobenzene (also known as DETDA or diethyl toluene diamine), di(methylthio) toluene diamine, 1,3,5-triethyl-2,6-diaminobenzene, toluene diamine derivatives containing halogen groups, cyano groups, alkoxy, alkylthio, alkenyl or carbonylic moieties, primary and secondary amine terminated polyethers of 100–10,000 molecular weight having 2–6 functionality, preferably from 2 to 3, and mixtures thereof. Commercial products include the Jeffamine compounds from Huntsman Corporation, Conroe, Tex., and Polamine 650 and Polamine 1000 from Polaroid Corporation, Assonet, Mass. The preferred amine intermediate is Jeffamine T-403 trimethylol propane tris [poly{propylene glycol} amine terminated] ether available from Huntsman Corporation, Conroe, Tex.

Aldehyde compounds useful in this invention for making polyimines are bound to aromatic residues having a functionality of ≧1, preferably 1, and a molecular weight of about 44 to 10,000, preferably 72 to 5000. Aldehyde compounds useful in this invention include those represented by the formula R'-[C(O)-R"]$_y$ where R' is a hydrocarbon group, which may also contain oxygen, nitrogen, sulfur or halogen, and R" is a hydrogen or a hydrocarbon group, which may also contain oxygen, nitrogen, sulfur or halogen, wherein y is ≧1, preferably 1. Suitable aldehydes include: benzaldehyde, p-tolualdehyde, phenylethanal, glutaric dialdehyde, isophthalaldehyde, phthalaldehyde and terephthalaldehyde.

The fourth ingredient of the resin system is one or more olefinically unsaturated monomers which copolymerize with the unsaturated polyester resin. Useful monomers include styrene, methyl methacrylate, divinyl benzene, alpha-methyl styrene, vinyl acetate, alkyl acrylates, and methacrylates. The most frequently used and preferred monomer is styrene.

Additional optional ingredients include mold releases such as zinc stearate and calcium stearate, fillers such as calcium carbonate, fly ash, wood flour, mica, clay, glass or ceramic beads, cure accelerators such as organic cobalt compounds, cure initiators such as peroxyesters, dialkyl peroxides, alkyl aryl peroxides, diaryl peroxides, peroxy ketals and ketone peroxides. Polymerization inhibitors such as butyl hydroxy toluene (BHT), parabenzoquinone (PBQ), hydroquinone (HQ), toluhydroquinone (THQ), are also optional ingredients. In addition, some molding compositions such as sheet molding compound (SMC) or bulk molding compond (BMC) must be "thickened" to facilitate handling after mixing the glass reinforcement with the filled polyester resin formulation. This thickening is usually done by mixing in a "B-side" which contains a mineral base such as magnesium or calcium oxide and/or hydroxide. The residual carboxylic acid ends on the polymers in the resin composition react with the base and tie the chain together with an ionic bond. This introduces the required thickening by increasing the molecular weight of the polymer and thus its "apparent viscosity." Other thickening mechanisms such as polymer crystallization or urethane bond formation can also be used.

For use of the aldimine enhancers of this invention, the above described ingredients were processed into sheet-molding compound, according to standard methods. These materials could also be used in bulk molding compound, resin transfer molding, and other polyester composite processing techniques. Resins, additives, and catalysts were blended with a Cowles mixer, then fillers and internal mold release agent sheared in at ~3000 rpm. Care was taken to ensure this paste was mixed to homogeneous consistency and uniform temperature. The thickening agent, a magnesium oxide dispersion, was mixed in immediately prior to processing across the SMC machine. SMC was allowed to mature to 25–35 mm cps (HBT 1×viscometer, Tf spindle@ 1 rpm), approximately 2–4 days, and molded. For test plaques, a 454 gram charge was molded at 1000 psi on a 12 in.×12 in.×0.100 in. Class-A flat plaque tool. Panels were tested with a LORIA surface quality analyzer, and submitted for determination of tensile and flexural properties and 24-hour water absorption.

In the following examples all parts are by weight and in the metric system unless otherwise specified. All references cited herein are hereby expressly incorporated by reference.

EXAMPLE A

This example describes the preparation of an aldimine from an cyclic diamine and an aromatic aldehyde (Aldimine A).

231.6 grams isophorone diamine and 50 ml toluene were charged to a reactor followed by the slow addition of 291.5 grams benzaldehyde to control the exotherm <60° C. After all the benzaldehyde was added, the reaction temperature was increased to 100°–125° C. to azeotropically remove water formed from the reaction. The solvent and excess benzaldehyde were removed at 140° C.

EXAMPLE B

This example describes the preparation of an aldimine from an aliphatic triamine and an aromatic aldehyde (Aldimine B).

400 parts by weight of polyoxypropylenetriamine (Jeffamine T-403, Mn ~440) and 75 parts of toluene were charged to a reactor followed by the slow addition of 270 parts of benzaldehyde to control the exotherm to <60° C. After all the benzaldehyde was added, the reaction temperature was increased to 100°–125° C. to azeotropically remove water formed from the reaction. The solvent and excess benzaldehyde were removed at 140° C.

EXAMPLE C

This example describes the preparation of an aldimine from an aliphatic diamine and an aromatic aldehyde (Aldimine C).

165 grams diprimary amine of dimer acid (Kemamine 3680, obtained from Witco Corporation) and 15 ml. toluene were charged to a reactor followed by the slow addition of 53.6 grams of benzaldehyde to control the exotherm <60° C. After all the benzaldehyde was added, the reaction temperature was increased to 100°–125° C. to azeotropically remove water formed from the reaction. The solvent and excess benzaldehyde were removed at 140° C.

EXAMPLE D

This example describes the preparation of an aldimine from an aromatic diamine and an aromatic aldehyde (Aldimine D).

133 grams diethyltoluene diamine (Ethacure 100, obtained from Ethyl Corporation, Baton Rouge, La.) and 25 grams of toluene were charged to a reactor, followed by the slow addition of 162.6 grams of benzaldehyde to control the exotherm <60° C. After all the benzaldehyde was added, the reaction temperature was increased to 100°–125° C. to azeotropically remove water formed from the reaction. The solvent and excess benzaldehyde were removed at 140° C.

The following examples illustrate the use of aldimines as surface quality enhancers in SMC formulations.

EXAMPLE 1

| component | #1 phr | #2 phr |
|---|---|---|
| AROPOL Q6585[1] resin | 64.46 | 64.46 |
| URALLOY 2020[2] resin | 27.97 | 27.97 |
| styrene | 5.02 | 5.02 |
| Additive A | | 5 |
| VDI cobalt accelerator[3] | 0.05 | 0.05 |
| butyl hydroxytoluene | 0.05 | 0.05 |
| t-butyl perbenzoate | 1.5 | 1.5 |
| zinc stearate | 4.5 | 4.5 |
| calcium carbonate | 220 | 220 |
| B-side (7.33% MgO dispersion) | 15.1 | 15.1 |
| LORIA SQ index | 59 | 51 |

[1]amorphous unsaturated polyester (propylene glycol and maleic anhyride), acid value 28–32, 65% non-volatiles in styrene, available from Ashland Chemical, Dublin, Ohio
[2]urethane linked saturated low-profile additive (adipic acid, 76 mole % ethylene glycol, 27 mole % propylene glycol), available from Ashland Chemical
[3]A cobalt-organic acid salt (12% metal) available from Mooney Chemicals Example 1 shows that addition of the aldimine additive A into standard formulation #1, based on propylene maleate unsaturated polyester and a polyurethane low-profile additive, improves surface quality, as measured by LORIA surface analyzer. (The lower the index number, the smoother the surface). Formulation #2, with 5 phr of the aldimine additive, shows an 8-point improvement in LORIA index.

EXAMPLE 2

| component | #1 phr | #2 phr | #3 phr | #4 phr |
|---|---|---|---|---|
| AROPOL Q6585 resin | 52.27 | 52.27 | 52.27 | 52.27 |
| Low Profile 40A[1] resin | 37.5 | 37.5 | 37.5 | 37.5 |
| styrene | 7.9 | 7.9 | 7.9 | 7.9 |
| Additive B | | 5 | | 5 |
| VDI cobalt accelerator | 0.1 | 0.1 | 0.1 | 0.1 |
| butyl hydroxytoluene | 0.1 | 0.1 | 0.1 | 0.1 |
| t-butyl perbenzoate | 1.5 | 1.5 | 1.5 | 1.5 |
| zinc stearate | 4.5 | 4.5 | 4.5 | 4.5 |
| calcium carbonate | 230 | 230 | 230 | 230 |
| B-side (9.7% MgO dispersion) | 12 | 12 | 10 | 10 |
| LORIA SQ index | 115 | 86 | 105 | 71 |

[1]polyvinyl acetate low-profile additive, 40% non-volatiles in styrene.

Example 2 shows addition of the aldimine additive B into a standard formulation containing polyvinyl acetate low-profile additive. Formulation #1 is a control formulation containing 12 phr B-side. Formulation #3 is another control, essentially the same as #1 except for the B-side level. Formulation #2 shows that, with the addition of the aldimine surface quality enhancing additive B, surface quality index, as measured by LORIA surface analyzer, drops (improves) 29 points over the control (#1). Formulation #4 again shows that surface quality, as measured by LORIA analyzer, improves in comparison with the control system (#3), in this case by 34 points.

EXAMPLE 3

| component | #1 phr | #2 phr |
|---|---|---|
| AROPOL 06585 resin | 52.3 | 52.3 |
| AROPOL Q701C[1] resin | 7.9 | 7.9 |
| styrene | 37.5 | 37.5 |
| Additive B | | 5 |
| VDI cobalt accelerator | 0.1 | 0.1 |
| butyl hydroxytoluene | 0.1 | 0.1 |
| t-butyl perbenzoate | 1.5 | 1.5 |
| zinc stearate | 4.5 | 4.5 |
| calcium carbonate | 220 | 220 |
| B-side (9.7% MgO dispersion) | 10 | 10 |
| LORIA SQ index | 155 | 100 |

[1]polymethylmethacrylate low-profile additive, 40% non-volatiles in styrene available from Ashland Chemical Example 3 shows the effect of the aldimine additive in an SMC formulation using polymethylmethacrylate as a low-profile additive. Formulation #1 is the control system, giving a surface quality (LORIA) index of 155. In the modified formulation, #2, the addition of the aldimine surface-quality enhancing additive improves the LORIA index by 50 points.

EXAMPLE 4

| component | #1 phr | #2 phr | #3 phr | #4 phr |
|---|---|---|---|---|
| AROPOL A3058[1] | 64.5 | 64.5 | 64.5 | 64.5 |
| ENVIREZ 2431[2] | 30 | 30 | 30 | 30 |
| styrene | 5.5 | 5.5 | 5.5 | 5.5 |
| Additive B | | 5 | | 5 |
| VDI cobalt accelerator | 0.1 | 0.1 | 0.1 | 0.1 |
| butyl hydroxytoluene | 0.1 | 0.1 | 0.1 | 0.1 |
| t-butyl perbenzoate | 1.5 | 1.5 | 1.5 | 1.5 |
| zinc stearate | 4.5 | 4.5 | 4.5 | 4.5 |
| calcium carbonate | 230 | 230 | 185 | 185 |
| B-side (9.7% MgO dispersion) | 10 | 10 | | |

-continued

| component | #1 phr | #2 phr | #3 phr | #4 phr |
|---|---|---|---|---|
| B-side (29.5% MgO dispersion) | | | 3 | 3 |
| LORIA SQ index | 122 | 99 | 98 | 83 |

[1]An unsaturated polyester based on recycled polyethylene terephthalate, propylene glycol, and maleic anhydride, cooked to acid value of 26–30 mg KOH/g, and cut in styrene to 70% solids.
[2]An epoxy-extended saturated polyester low-profile additive based on recycled polyethylene terephthalate, diethylene glycol, and adipic acid, cut in styrene to 50% non-volatiles.

Example 4 shows surface quality improvement with the addition of aldimine B to a polyester SMC system based on recycled polyethylene terephthalate. Formulations #1 and #2 differ from #3 and #4 in the type of thickening agent (B-side) used. In formulation #2, the addition of aldimine B has brought a 23-point improvement in the LORIA surface quality index over the control, formulation #1. Formulation #3 shows the basic system can be improved by a change in thickening agent, however addition of the aldimine additive again improves surface quality over the control system (compare the control #3 to the experimental #4), with a 15-point reduction in LORIA surface quality index.

EXAMPLE #5

| component | #1 phr | #2 phr |
|---|---|---|
| AROPOL Q6585 | 64.46 | 64.46 |
| URALLOY 2020 | 27.97 | 27.97 |
| Styrene | 5.02 | 5.02 |
| Aldimine C | | 5 |
| VDI cobalt accelerator | 0.05 | 0.05 |
| butyl hydroxytoluene | 0.5 | 0.5 |
| t-butyl perbenzoate | 1.5 | 1.5 |
| zinc stearate | 4.5 | 4.5 |
| calcium carbonate | 220 | 220 |
| B-side (7.33% MgO dispersion) | 15.1 | 15.1 |
| LORIA SQ index | 61 | 55 |

Example 5 shows the effect of Additive C, diprimary amine of dimer acid reacted with benzaldehyde, in an SMC system based on propylene maleate unsaturated polyester and polyurethane low-profile additive (Note this is the same basic system described in Example 1). The addition of the aldimine enhancer improves surface quality 10% over the control system (#1); in this range of premium surface quality a 6-point improvement is significant.

EXAMPLE #6

| component | #1 phr | #2 phr |
|---|---|---|
| AROPOL QG585 | 64.46 | 64.46 |
| URALLOY 2020 | 27.97 | 27.97 |
| Styrene | 5.02 | 5.02 |
| Aldimine D | | 5 |
| VDI cobalt accelerator | 0.05 | 0.05 |
| butyl hydroxytoluene | 0.5 | 0.5 |
| t-butyl perbenzoate | 1.5 | 1.5 |
| zinc stearate | 4.5 | 4.5 |
| calcium carbonate | 220 | 220 |
| B-side (7.33% MgO dispersion) | 15.1 | 15.1 |
| LORIA SQ index | 65 | 51 |

Example 6 shows the effect of Additive D, diethyltoluenediamine reacted with benzaldehyde, in an SMC system based on propylene maleate unsaturated polyester and polyurethane low-profile additive (Note this is the same basic system described in Example 1). The addition of the aldimine enhancer improves surface quality 23% over the control system (#1); reducing LORIA surface quality index by 14 points.

EXAMPLE #7

| component | #1 phr | #2 phr |
|---|---|---|
| AROPOL Q6585 | 60 | 60 |
| polystyrene LPA[1] | 40 | 40 |
| Aldimine B | | 5 |
| VDI cobalt accelerator | 0.1 | 0.1 |
| butyl hydroxytoluene | 0.1 | 0.1 |
| t-butyl perbenzoate | 1.5 | 1.5 |
| zinc stearate | 4.5 | 4.5 |
| calcium carbonate | 180 | 180 |
| B-side (9.7% MgO dispersion) | 10 | 10 |
| LORIA index | 113 | 100 |

[1]Novacor PS2400/300 polystyrene beads, dissolved in styrene to 40% non-volatiles.

Example 7 shows the improvement in surface quality obtained with the addition of Aldimine B to an SMC system containing propylene maleate base resin and polystyrene low-profile additive. Surface quality of the control system (#1), as determined by LORIA surface analyzer, was 113. With the addition of the aldimine surface-quality enhancing additive (#2), LORIA index dropped to 100, showing a marked improvement in surface smoothness

I claim:

1. In a thermosetting polyester resin composition for use in sheet molding compound comprising
   unsaturated polyester resin,
   unsaturated monomer, and
   low profile additive,
   the improvement comprising the addition of an effective proportion of an aromatic aldimine surface quality enhancer.

2. The composition of claim 1 wherein said aldimine is made by condensation with water cleavage from trimethylol propane tris ether and benzaldehyde.

3. The composition of claim 1 wherein said aldimine is made by condensation with water cleavage from diprimary amine of dimer acid and benzaldehyde.

4. The composition of claim 1 wherein said aldimine is made by condensation with water cleavage from isophorone diamine and benzaldehyde.

5. The composition of claim 1 comprising 4 to 6 parts aldimine in 100 parts resin, monomer and low profile additive.

6. The composition of claim 5 comprising 5 parts aldimine.

7. The composition of claim 1 wherein said low profile additive is a thermoplastic low profile additive selected from the group consisting of saturated polyester, polyurethane, and polymethyl methacrylate, polystyrene, and epoxy-extended polyester.

8. A part made by heating under pressure a molding compound comprising unsaturated polyester resin, styrene, low profile additive, and an aromatic aldimine.

9. The part of claim 8 wherein said sheet molding compound further comprises a hydroxyl functional acrylate compound.

10. The part of claim 9 wherein said compound is hydroxyl methacrylate.

11. The part of claim 9 wherein said compound is hydroxypropyl methacrylate.

12. The part of claim 8 wherein said aldimine is made by condensation with water cleavage from trimethylolpropane tris ether and benzaldehyde.

13. The part of claim 8 wherein said aldimine is made by condensation with water cleavage from diprimary amine of dimer acid and benzaldehyde.

14. The part of claim 8 wherein said aldimine is made by condensation with water cleavage from isophorone diamine and benzaldehyde.

15. The part of claim 8 comprising 4 to 6 parts aldimine in 100 parts resin, monomer and low profile additive.

16. The part of claim 15 comprising 5 parts aldimine.

* * * * *